United States Patent [19]

Weiler et al.

[11] Patent Number: 4,886,293

[45] Date of Patent: Dec. 12, 1989

[54] GAS PRODUCER FOR FILLING A GAS CUSHION RESTRAINING DEVICE

[75] Inventors: Werner Weiler, Lichtenwald; Helmut Patzelt, Kernen-Stetten, both of Fed. Rep. of Germany

[73] Assignee: Daimler-Benz AG, Stuttgart, Fed. Rep. of Germany

[21] Appl. No.: 291,173

[22] Filed: Dec. 28, 1988

[30] Foreign Application Priority Data

Aug. 9, 1988 [DE] Fed. Rep. of Germany ....... 3826960
Sep. 17, 1988 [DE] Fed. Rep. of Germany ....... 3831641

[51] Int. Cl.$^4$ .............................................. B60R 21/26
[52] U.S. Cl. ..................................... 280/736; 280/741
[58] Field of Search ...................... 280/741, 742, 736

[56] References Cited

U.S. PATENT DOCUMENTS

| 4,013,010 | 3/1977 | Schneiter et al. | 280/741 |
| 4,249,673 | 2/1981 | Katoh et al. | 280/741 |
| 4,316,874 | 2/1982 | Kasama et al. | 280/741 |
| 4,561,675 | 12/1985 | Adams et al. | 280/741 |
| 4,590,041 | 5/1986 | Hill | 280/741 |

Primary Examiner—Kenneth R. Rice
Attorney, Agent, or Firm—Barnes & Thornburg

[57] ABSTRACT

A gas producer is disclosed for filling a gas cushion restraining device for occupants of vehicles. The gas producer includes a combustion chamber filled with fuel and surrounded by a wall which exhibits apertures for the discharge of the gas produced, said apertures being sealed hermetically by a destructible cover at the start of the burning process of the fuel up to a specific pressure rise in the combustion chamber. In order to obtain a planned pressure rise irrespective of the initial temperature of the gas producer, it is provided according to the invention that the total cross-sectional area of the discharge apertures is automatically enlargeable as a function of the rising combustion chamber pressure.

8 Claims, 1 Drawing Sheet

GAS PRODUCER FOR FILLING A GAS CUSHION RESTRAINING DEVICE

BACKGROUND AND SUMMARY OF THE INVENTION

The invention relates to a gas producer for filling a gas cushion restraining device for occupants of vehicles, having a combustion chamber filled with fuel and surrounded by a wall which exhibits apertures for the discharge of the gas produced, said apertures being sealed hermetically by a destructible cover at the start of the burning process of the fuel up to a specific pressure rise in the combustion chamber.

The efficiency of such gas producers is dependent on temperature, so that the gas cushion is inflated more rapidly at high temperatures of the fuel than at low temperatures. The reason for this is the dependence of the burning behaviour of the fuel upon temperature for a constant cross-sectional area of the nozzle of the combustion chamber. However, the strengths of the entire system, comprising producer, gas cushion, retaining means and, for example, steering wheel have to be dimensioned for the maximum efficiency of the producer at high ambient temperatures for safety reasons.

This dependence of the burning behaviour of the producer upon the temperature is also disadvantageous in another respect. Only a certain time, of 30 msec for example, is available for the filling of the gas cushion. This time is also required in full by a producer, the temperature of which is −30° C. for example at the time of tripping or detonation. However, if the producer temperature at the time of the accident is +80° C. for example, then the gas cushion will have been filled after only 24 msec, for example, which results in an unnecessary increase in the acoustic pressure with its negative effects upon the vehicle occupants.

It is therefore an object of the present invention to avoid these described disadvantages and to develop a gas producer so that a more uniform pressure curve is obtained irrespective of the inherent temperature of the producer at the time of tripping.

This object is achieved according to the invention in a generic gas producer, in that the total cross-sectional area of the discharge apertures is automatically enlargeable as a function of the rising combustion chamber pressure.

Other objects, advantages and novel features of the present invention will become apparent from the following detailed description of the invention when considered in conjunction with the accompanying drawings.

DETAILED DESCRIPTION OF THE DRAWINGS

Figure 1:
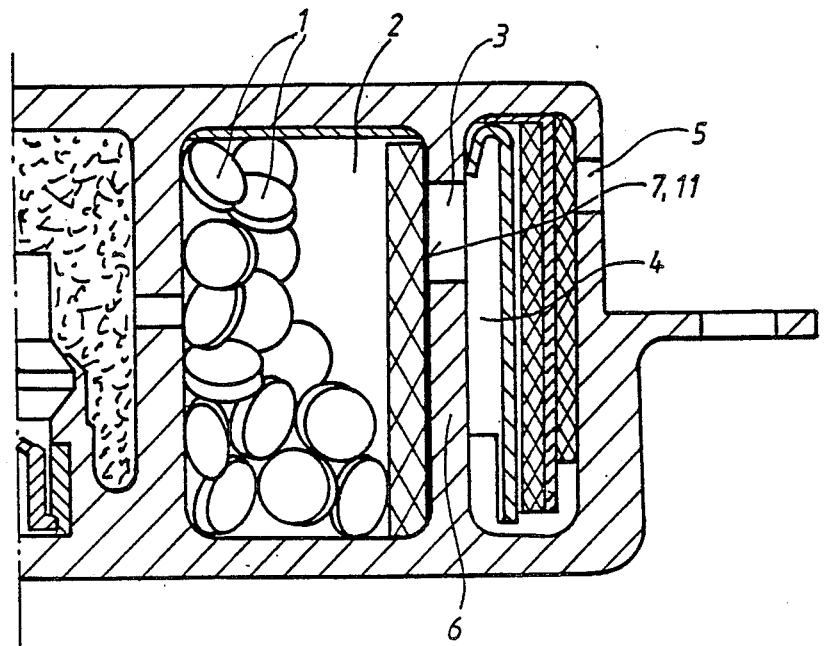
FIG. 1 shows a section through one half of a gas producer constructed in accordance with a preferred embodiment of the invention.

The gas producer illustrated partially in FIG. 1 of the drawing will be explained here only insofar as this is necessary for an understanding of the present invention.

The gas producer exhibits a combustion chamber 2 accommodating the fuel 1, which is connected through apertures 3 to a diffuser chamber 4 radially externally adjacent thereto, which in turn communicates through apertures 5 with the interior of the air bag. In the design assembled state the apertures 3 between combustion chamber 2 and diffuser chamber 4 are sealed hermetically by a cover 7, in the form of a metal foil, for example, destructible upon corresponding pressure evolution, and placed against the wall 6 on the inside.

Figure 2:
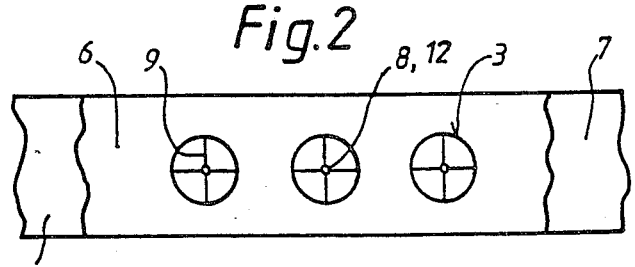
FIG. 2 shows on a different scale a developed region of the producer wall of FIG. 1 which carries the discharge apertures, viewed from outside.

In the exemplary embodiment of the invention according to FIG. 2 apertures 3 of equal size are provided in the wall 6. The tear-open cover 7 located behind in the drawing exhibits in the region of each of the apertures 3 a readily destructible central region 8, starting from which radial breaking lines 9 extend which tear open only at relatively higher pressure.

Figure 3:
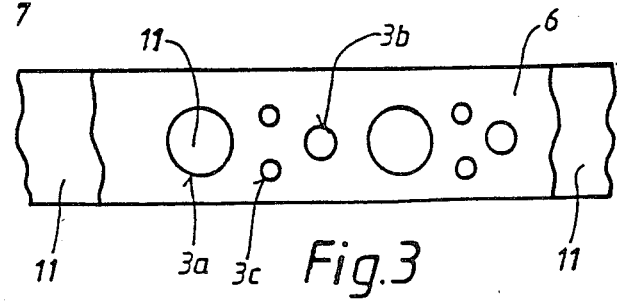
FIG. 3 shows a view corresponding to FIG. 2, but for another embodiment of the invention.

In the exemplary embodiment illustrated in FIG. 3, apertures 3a, 3b, 3c of different sizes are illustrated, which are cleared in the sequence of their size by the destruction of a customary foil cover 11 located behind them. If desired the tearing strength of the foil cover can be varied in the region of different bore sizes by varying their effective wall thickness.

Figure 4:
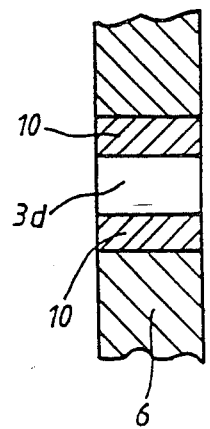
FIG. 4 shows a vertical section through an aperture with a fuse constructed according to yet another embodiment of the invention.

Lastly, FIG. 4 shows an embodiment of the invention in which a fuse 10, which is inserted into an aperture 3d, burns due to the hot gases flowing through and thereby enlarges the aperture 3d continuously in conformity with the pressure rise in the combustion chamber 2.

In conclusion, the background of the invention will be explained again in summary form.

As already explained, the burning speed of the fuel is a function of its initial temperature with corresponding pressure in the combustion chamber. Therefore if the cross-sectional area of the discharge apertures is dimensioned for a mean fuel temperature of +20 C. for example, very rapid burning occurs at this ambient temperature, and does not exhaust the maximum permissible time of, for example, 30 msec. The maximum, permissible time would be exhausted, for example, at an initial temperature of the fuel of −30° C., whereas at an initial temperature of +60° C., for example, an extremely rapid buring of the fuel and hence filling of the air bag would occur, which would result in a highly undesirable rapid pressure rise in the passenger compartment too.

These differences in the burning time can be largely compensated by the invention.

Thus at −30° C. a relatively low initial pressure would exist in the combustion chamber, which causes the opening of only a relatively small cross-sectional area of the discharge apertures. This in turn causes a further pressure build-up in the combustion chamber and hence an increase in the burning speed.

At +60° C. on the other hand a high initial pressure in the combustion chamber will be established very rapidly, leading to the opening of the greatest possible discharge area, whereby a further pressure rise in the combustion chamber is at least flattened and the burning speed thereby reduced.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Gas producer for filling a gas cushion restraining device for occupants of vehicles, having a combustion chamber filled with fuel and surrounded by a wall which exhibits apertures for the discharge of the gas produced, said apertures being sealed hermetically by a destructible cover at the start of the burning process of the fuel up to a specific pressure rise in the combustion chamber, wherein the total cross-sectional area of the discharge apertures is automatically enlargeable as a function of the rising combustion chamber pressure.

2. Gas producer according to claim 1, wherein the wall of the combustion chamber exhibits apertures of different diameters, and wherein, in the design state of the producer, said apertures are sealed by a tear-open foil cover arranged on the inside of the wall.

3. Gas producer according to claim 2, wherein the cover is formed by a sheet metal strip placed against the wall.

4. Gas producer according to claim 1, wherein the apertures in the wall exhibit equal diameters and wherein annular fuses are inserted into said apertures.

5. Gas producer according to claim 1, wherein a tear-open cover arranged on the inside of the wall of the combustion chamber exhibits a central region destructible at relatively low pressure and of smaller size than the associated wall aperture, and wherein radial breaking lines destructible at higher pressure start from this central region.

6. Gas producer according to claim 1, wherein a tear-open cover arranged on the inside of the wall of the combustion chamber exhibits a central punched hole region of smaller size than the associated wall aperture, wherein radial breaking lines or punched parting lines destructible at higher pressure start from said central hole region, and wherein the hole region is covered by a separate foil in the initial state.

7. Gas producer according to claim 1, wherein the apertures are covered on the outside of the wall by a bimetallic spring which clears the passage progressively with rising temperature.

8. Gas producer according to claim 1, wherein the tear-open cover exhibits different wall thicknesses in the region of different apertures.

* * * * *